United States Patent [19]
Sekiya et al.

[11] Patent Number: 5,805,210
[45] Date of Patent: Sep. 8, 1998

[54] ARRIVAL ORDER JUDGMENT APPARATUS

[75] Inventors: Satoshi Sekiya; Nobuo Obara, both of Chiba, Japan

[73] Assignee: Seiko Instruments Inc., Japan

[21] Appl. No.: 705,540

[22] Filed: Aug. 29, 1996

[30] Foreign Application Priority Data

Aug. 30, 1995 [JP] Japan .................................. 7-222319
Jul. 9, 1996 [JP] Japan .................................. 8-179531

[51] Int. Cl.⁶ .................................................. H04N 7/18
[52] U.S. Cl. .............................. 348/157; 348/311; 368/9; 377/4; 377/20; 386/117; 386/119
[58] Field of Search .................................. 348/157, 311; 368/9; 377/4, 20; 386/117, 119

[56] References Cited

U.S. PATENT DOCUMENTS

| | | | |
|---|---|---|---|
| 3,678,189 | 7/1972 | Oswald | 348/157 |
| 4,074,117 | 2/1978 | DeLorean et al. | 377/20 |
| 4,142,680 | 3/1979 | Oswald et al. | 377/4 |
| 4,158,853 | 6/1979 | Sullivan et al. | 348/157 |
| 4,523,204 | 6/1985 | Bovay | 396/315 |
| 4,743,971 | 5/1988 | Hugli | 348/157 |
| 4,797,751 | 1/1989 | Yamaguchi | 386/117 |
| 5,103,433 | 4/1992 | Imhof | 368/9 |
| 5,136,283 | 8/1992 | Nobs | 345/196 |
| 5,278,657 | 1/1994 | Tamura | 348/311 |
| 5,280,363 | 1/1994 | Nakamura et al. | 386/119 |
| 5,493,331 | 2/1996 | Takahashi et al. | 348/157 |
| 5,513,103 | 4/1996 | Charlson | 364/411 |

*Primary Examiner*—Howard W. Britton
*Assistant Examiner*—Frank Snow
*Attorney, Agent, or Firm*—Adams & Wilks

[57] ABSTRACT

An arrival order judgment device is easy in operation to judge the arrival order for positively recording slit images before and after the finish line for the arrival order judgment only in a necessary minimum range. Slit signals picked up by a line image sensor camera are inputted into a video signal delay circuit. The video signal delay circuit outputs the slit video signals at a predetermined delay time period A. When competitors approaches the finish line and the moment the competitors interrupt a photoelectric device, ON signals are inputted into a memory device to start the record of the images delayed for a predetermined time period. When the competitors are not on the finish line, the photoelectric device outputs OFF signals to a record instruction delay circuit. The record on the memory device is interrupted after the delay period set at the record instruction delay circuit has lapsed. Thus, it is possible to record the images after the competitors have passed through the finish line.

18 Claims, 3 Drawing Sheets

F I G. 3
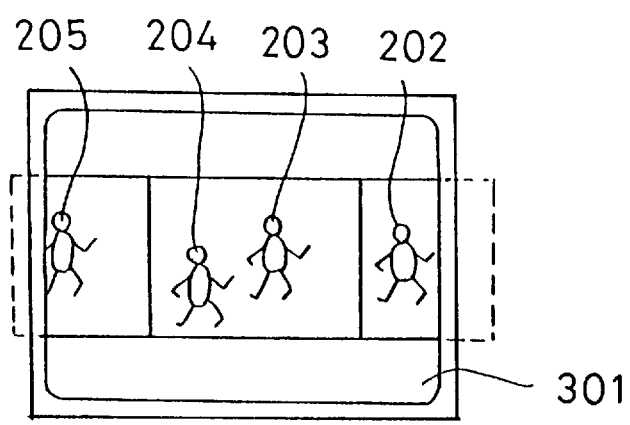

ARRIVAL ORDER JUDGMENT APPARATUS

BACKGROUND OF THE INVENTION

The present invention relates to an apparatus for electronically judging and recording an arrival order and a finish time in athletic competitions such as track events.

Conventionally, an apparatus for electronically judging an arrival order and a finish time which is accurate to one thousandth of a second in for use athletic competitions, boat races and the like is known. In particular, line image sensor cameras each having a narrow slit-like image field of view are used so that the slit images are continuously taken through extremely narrow fields which are aligned on the finish line. A cursor, such as a vertical line, is superimposed on the slit images for the judgment of the arrival order or time. Such an arrival order judgment apparatus is known as a precise judgment machine.

The arrival order judgment apparatus may judge the arrival order of a plurality of solid objects by measuring a particular order and elapsed time of the respective solid objects which have passed through a predetermined reference line. For example, in a short distance athletic competition a predetermined reference line is used as a finish line, and the plurality of solid objects are competitors who start at the same time. The arrival order judgment apparatus stores, in series, the image elements in the form of slits continuously taken through the slit camera into a memory means such as a semiconductor memory or a magnetic recording medium. The slit-like image elements are arranged along a time axis in the memory means to thereby form composite slit images. The composite slit images are superimposed with the cursor or time information by a display control means. Thereafter, the slit images are played back on a display device such as a CRT monitor or a video printer. The arrival order judgment apparatus is provided with an operating board such as a keyboard. The cursor is operatively moved on the image field of the CRT monitor to thereby carry out a readout of the identification or time of each solid object to reach a final determination as to the arrival order.

However, such an arrival order judgment apparatus must record the images not only at the moment at which the competitors finish the event but also slightly before and after the finish. For this purpose, conventionally, judges stand by the finish line, and push switches for starting the recording just before the competitors have passed through the finish line and release the switch after the passage to thereby complete the recording. However, such a recording manner suffers from a disadvantage that, due to the need to manually operate the switches, the pushing of a switch might be forgotten, resulting in the failure to record one or more of the images, or the images before and after the finish might be taken for longer than necessary, resulting in rapid depletion of the memory and also in the failure pickup of the necessary range.

Also, in the case where the images before and after the finish are taken for longer than necessary, when the images are played back on the CRT monitor for the judgment, a range of the movement of the cursor is increased due to a large amount of blank between adjacent competitors. Accordingly, this system suffers from a problem that it takes a longer time to read out the finish time of each competitor than is necessary. Furthermore, when the composite slit images are recorded by the video printer, the system suffers from another problem in that a larger piece of recording video printer paper is is consumed than is space necessary due to the extra blank space.

SUMMARY OF THE INVENTION

Therefore, an object of the present invention is to provide an arrival order judgment apparatus for the automatic recording of the images before and after slit finish, which are necessary for the arrival order determination and for performance of an accurate arrival order measurement.

Another object of the present invention is to provide an arrival order judgment apparatus in which a range of the images to be recorded is kept at a necessary minimum level to thereby reduce the consumption of the storage capacity, recording capacity and the printer paper, and to facilitate the judgment operation.

In order to attain these and other objects, the following arrangement is adopted according to the present invention.

The arrival time judgment apparatus according to the present invention judges the arrival order by measuring the lapse of time of a plurality of solid objects which are essentially running toward a predetermined reference line. The arrival time judgment apparatus comprises a pickup means, a timing means, an image signal delay means, a memory means, a solid object identifying means, a record instruction delay means, a display controlling means and a display means.

The pickup means is composed of a line image sensor camera having a view field on a very narrow slit. The line image sensor camera picks up, at constant intervals, the solid objects, which have passed through the reference line in order and outputs the slit image signals in alignment with the reference line.

The timing means is composed of a timer for receiving the start signal for the competition, starting the timing operation and outputting timing information.

The image signal delay means receives the slit image signals outputted from the line image sensor camera, delays the slit image signals by a predetermined time, and outputs signals together with the timing information output by the timer.

The solid object identifying means is composed of, for example, an optical device using infrared beams. The optical device is disposed in correspondence with the reference line, outputs ON signals when the solid objects are on the finish line and outputs OFF signals when the solid objects are not on the finish line. The solid object identifying means may be composed of an electromagnetic device using electromagnetic wave or an acoustic device using supersonic waves.

The record instruction delay means outputs delayed OFF signals which are delayed by a predetermined time from the OFF signals outputted from the photoelectric device.

The memory means is composed of a semiconductor memory device, or a magnetic memory device, or the like. The memory means starts recording of the time information and the slit image signals outputted from the image signal delay circuit in response to the ON signals of the photoelectric device, and stop the recording in response to the delayed OFF signals outputted from the record instruction delay circuit.

The display controlling means reads out the slit images recorded in the memory means and outputs display signals on which the images needed for the arrival order judgments are superimposed.

The display means is composed of a visual display device such as a CRT monitor, a video printer or the like. The display means receives the display signals outputted from the display controlling means and visually displays the recorded slit images.

In the arrival order judgment apparatus according to the present invention, since the record of the slit images is started in accordance with the ON signals from the photoelectric device, and the recording is stopped in response to the delay OFF signals of the record instruction delay means, it is possible to dispense with persons who are specialized in generating the ON/OFF signals for such recording. Also, the recording is started with respect to the slit images at a predetermined time before the moment the solid objects have passed through the reference line, by the image signal delay circuit. Furthermore, by the record instruction delay circuit, it is possible to record the slit images at a predetermined time after the moment the solid objects have passed through the reference line. Accordingly, it is possible to carry out the recording only in the necessary minimum range for judgment of the arrival order of each solid object.

BRIEF DESCRIPTION OF THE DRAWINGS

In the accompanying drawings:

FIG. 3 is a diagram showing a display image for the judgment according to the arrival order judgment apparatus according to the present invention.

DESCRIPTION OF THE PREFERRED EMBODIMENTS

An embodiment of the present invention will now be described with reference to the accompanying drawings.

Figure 1:
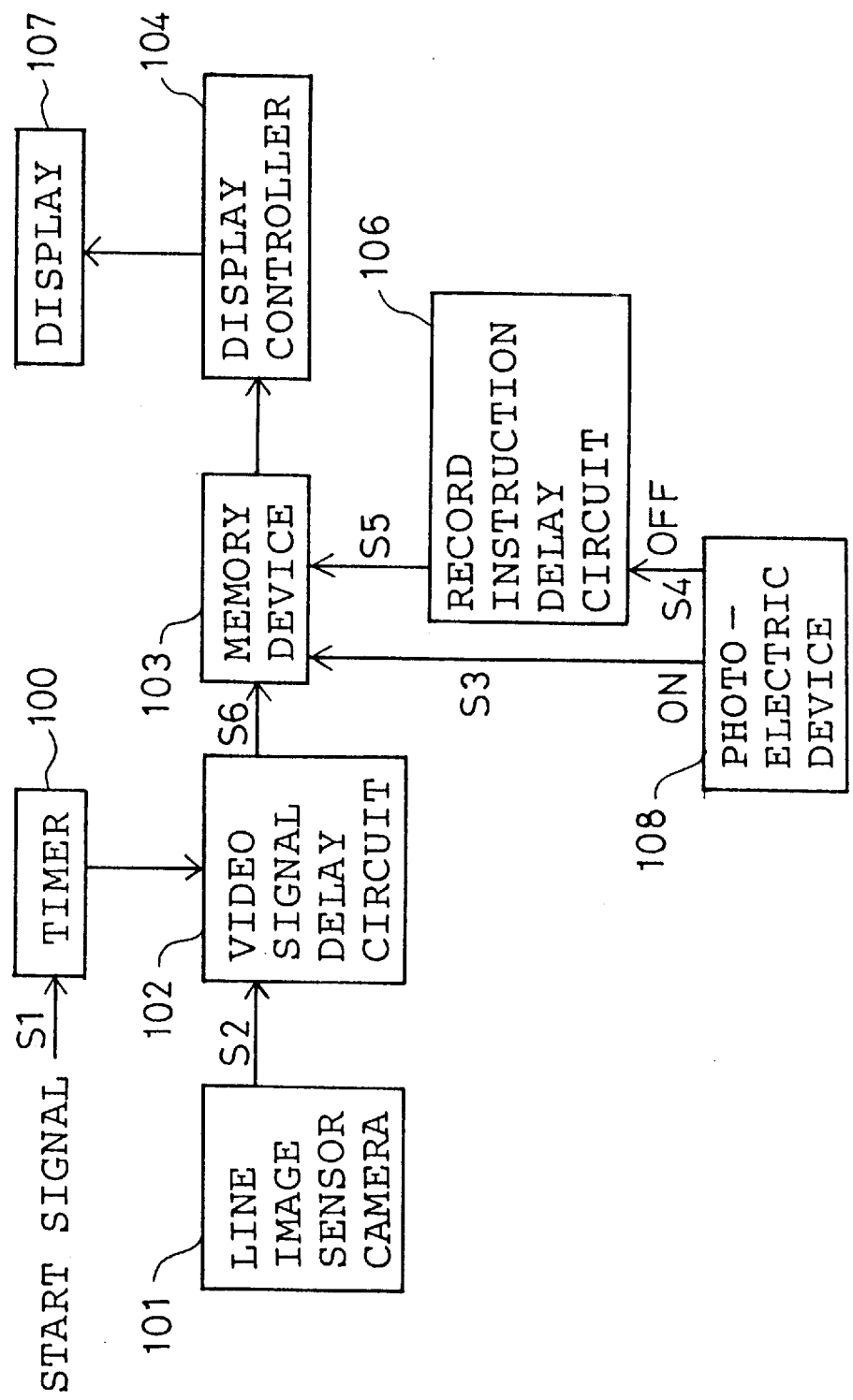
FIG. 1 is a function block diagram showing an arrival order judgment apparatus according to the present invention.

FIG. 1 is a function block diagram showing an arrival order judgment apparatus for electronically judging an arrival order and a goal time according to the present invention.

A line image sensor camera 101 is disposed in alignment with the finish line. The line image sensor camera 101 takes a slit-like of view field of view set on the finish line and repeatedly outputs the slit video signal S2, which has been taken, at regular intervals, for example, every one thousandth of a second.

When a start signal S1 for the competition is inputted into a timer 100, the measurement of time is started to measure elapsed time. The measured time information is consecutively input into a video signal delay circuit 102. The slit video signal S2 taken by the line image sensor camera 101 is consecutively input into the video signal delay circuit 102. The video signal delay circuit 102 outputs the slit video signal S2 after the delay of a predetermined period of time A. The value of the delay period of time A may be suitably selected depending upon the kind of competition. However, in the presently described embodiment, the delay period of time A is set at 0.1 seconds. In the 100 meter track race athletic competitions, a speed of each competitor is about 10 m/sec. Accordingly, the delay period of of 0.1 seconds corresponds to a running distance of about 1 meter.

At the moment the competitor has approached the finish line and has passed through a photoelectric device 108 using infrared beams or the like disposed on both sides of the finish line, an ON signal S3 is inputted into a memory device 103. In response to the ON signal S3, the memory device 103 recording the image which is delayed by the delay time period A by the video signal delay circuit 102. In this embodiment, the delay time period A is the image 0.1 seconds before the finish line. Accordingly, the image is recorded 0.1 seconds before the competitor reaches the finish line. Assuming the case where the judges perform the ON and OFF operation of the switches in the same way as in the conventional manner, this function is the same as that of pushing the switch when the competitor is running one meter before the finish line.

When the competitor is no longer present on the finish line, the photoelectric device 108 outputs an OFF signal S4 to a record instruction delay circuit 106. A delay period of time B is set in advance to the record instruction delay circuit 106. In this embodiment, it is set at 0.15 seconds. Accordingly, the OFF signal of the photoelectric device 108 is input to the memory device 103 0.15 seconds later. Thus, the interruption of recording is instructed. When the memory device 103 stops the recording of the video signal, 0.15 seconds have lapsed after the competitor could not be seen on the finish line. However, since the image to be actually recorded is the image at the delay time period A of the video signal delay circuit 102, i.e., 0.1 seconds before that, the image of 0.05 seconds after the competitor has not been seen on the finish line is recorded.

Also, assuming the case where the judge performs the ON and OFF operation of the switch in the conventional manner, this operation is the same function the judge releases the switch when the competitor has passed through the finish line and advanced about 0.5 meters beyond.

Namely, in order to record the image after the competitor has passed through the finish line, the delay time B of the record instruction delay circuit 106 has to be longer than the delay time A of the video signal delay circuit 102. A difference C between the delay time B and the delay time A is the recording time range after the competitor has passed through the finish line.

Whenever each competitor has passed through the finish line, with the above-described functions, the slit images of each competitor and the time lapse information measured by the timer 100 are consecutively recorded in units of one thousandth of a second to the memory device 103. The composite slit images recorded in the memory device 103 are read out by a display controlling circuit 104. After the cursor or vertical line, which is a sign for the measurement of the finish time or the judgment of arrival order, is superimposed thereon, the information is visually displayed on a display device 107 such as a CRT monitor.

The composite slit images in which the arrival order judgment or the time measurement has been carried out are printed out on the printer paper or played back by the video printer for the permanent record.

With the above-described function, even if the photoelectric device is set to operate at the moment the breast of the competitor has passed through the finish line in the athletic competition, since the whole body of the competitor including fore and hind limbs may be recorded, it is possible to carry out the positive arrival order judgment with each in identification of the competitor.

The range of the picture and record according to the present invention will now be described in more detail with reference to FIG. 2.

Figure 2:
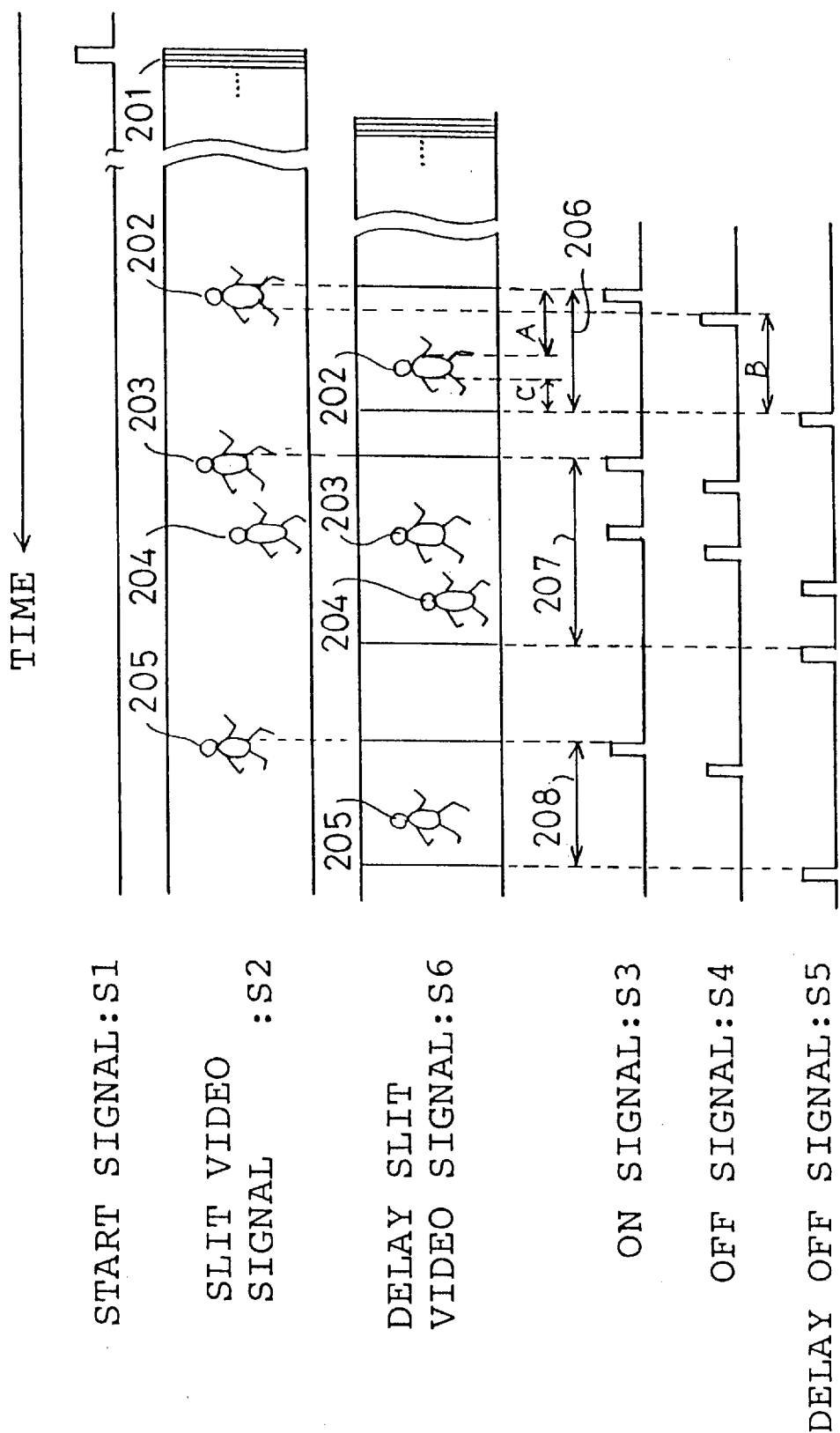
FIG. 2 is a timing chart showing an example of record according to the arrival order judgment apparatus according to the present invention.

FIG. 2 shows an example of a result in the case where the competitors 202, 203, 204 and 205 ran together. A time axis in FIG. 2 lapses from right to left.

When the start signal SI is turned ON, the slit video signal S2 by the line image sensor camera 101 becomes the delay slit video signal S6 which has been delayed by A=0.1 seconds by the video signal delay circuit 102.

The slit video signal S2 and the delay slit video signal S6 are shown as the composite slit image which is obtained by superimposing the slit images 201 to be taken every one thousandth second in the time axis direction for the sake of explanation. Namely, the image of the competitor 202 is formed by composing a number of continuous slit images 201.

When the leading competitor 202 interrupts the photoelectric device 108 disposed on the finish line, the ON signal S3 is outputted, and the record starts by the memory device 103. The image to be recorded here is the delay slit video signal S6. The record is started from the slit video signal 0.1 seconds before the leading competitor 202 interrupts the photoelectric device 108.

When the competitor 202 has passed through the finish line, the photoelectric device 108 outputs an OFF signal S4. This OFF signal S4 is outputted to the memory device 103 as a delayed OFF signal S5 which has been delayed by B=0.15 seconds to stop the recording. Namely, the interruption of recording is carried out 0.15 seconds after the competitor 202 has passed through the finish line. On the other hand, since the recorded slit image is an image 0.1 seconds before that, the image immediately before the record has been interrupted is an image of C=0.05 (0.15–0.1) after the competitor 202 has passed through the finish line. Thus, the image is recorded for each competitor from 0.1 seconds before the finish line to 0.05 seconds after the finish line.

Also, in the case where the competitor 203 and the competitor 204 are close to each other through the finish line, and the ON signal S3 for the competitor 204 is output before the delayed OFF signal S5 for the competitor 203 has been issued, the record is not interrupted and the competitor 203 and the competitor 204 are continuously recorded. Thereafter, the record is interrupted after the images have been recorded for 0.05 seconds after the competitor 204 has passed through the finish line.

Thus, recording is selectively carried out in the memory device 103 only for the periods indicated by the arrows 206, 207 and 208 in FIG. 2 from the delay slit video signal S6, i.e., the of time needed minimum period of time needed for the judgment of the arrival order and the measurement of the time. As a result, it is possible to reduce the capacity of the memory device 103. Otherwise, if the same capacity is used, it is possible to record more effective information.

FIG. 3 shows a condition in which the composite slit images recorded in the memory device 103 are displayed on the CRT monitor. Although the range for indicating the images on the CRT monitor at once is limited, only the necessary minimum range is shown according to the present invention, so that it is possible to display the plurality of competitors at once. For this reason, it is possible to reduce the operation such as the movement of the cursor and the movement of the image field for the judgment of the arrival time and the measurement of the finish time. Also, the judgment operation may be simplified for a short period of time. Accordingly, even if the interval between the successive competitions is short, there is no hindrance against the smooth advance of programs for the races.

Furthermore, in the case where the result of the competition is permanently recorded by the video printer, only the record for the necessary minimum period is effected in the same manner as in FIG. 3 to thereby shorten the printing time and simultaneously save the piece of printing paper.

As described above, according to the present invention, the moment the finish line is crossed by the competitors is detected by the solid object identifying means such as a photoelectric device, the ON signal is generated, and the images on the finish line, continuously taken by the line image sensor camera, are started to be recorded on the memory device. Then, when the competitor crosses the finish line, the OFF signal is issued from the photoelectric device to interrupt the record. Accordingly, the ON/OFF switching for the record is automatically carried out. There is no fear that the record drop would occur due to the forgetting of the switching. Also, the special persons for generating the ON/OFF signals are not necessary.

Since the video signals from the line image sensor camera are inputted into the memory device with a predetermined delay time through the delay circuit, even if the ON signal for the record start is inputted, the images are recorded from a predetermined time before the moment of the turn-on. For this reason, it is possible to record the condition before the finish for the competitors, for example, the condition of limbs of the competitors immediately before finishing.

Also, the OFF signals are inputted with a predetermined time lag through the record instruction delay circuit, and it is thus possible to record the condition after the competitors have finished, i.e., the slit images after the passage of the finish line. For this reason, the whole bodies of the competitors may be recorded. For example, race numbers of the competitors and the like may readily be visually identified. It is therefore easy to specify the competitors and to thereby accelerate the judgment of the arrival order.

As described above, since only the necessary images for the judgment are recorded, the capacity of the memory device may be effectively used, the images before and after the finish line are displayed on the image field, and the arrival time and order of each competitor may be confirmed while controlling the display, it is possible to realize the quick and positive arrival order judgment apparatus.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What we claim is:

1. An arrival order judgment apparatus for measuring the passage time as a plurality of solid objects move toward a predetermined reference line to permit the judging of an arrival order thereof, comprising:

a pickup means having a slit-like field of view aligned with the reference line for picking up a slit image of the respective solid objects as they pass the reference line in order and for outputting, in series, slit video signals aligned with the reference line;

a video signal delay means for receiving the slit video signals output by the pickup means and for outputting delayed slit video signals which are delayed from the slit video signals by a first predetermined delay time;

a timing means for starting a timing operation in response to a start signal, monitoring an elapsed time and outputting time information to the video signal delay means;

a solid object identifying means disposed in correspondence with the reference line for outputting ON signals when the respective solid objects are on the reference line and outputting OFF signals when the solid objects are not on the reference line;

a record instruction delay means for receiving the OFF signals output by the solid object identifying means and outputting corresponding delayed OFF signals which are delayed from the OFF signals by a second predetermined delay time;

a memory means for starting to record the time information and the slit video signals output by the video signal delay means in response to an ON signal output by the solid object identifying means and for stopping the recording in response to a delayed OFF signal output by the record instruction delay means so that an image of each object is recorded from a predetermined time before said object reaches the reference line to a predetermined time after it passes the reference line;

a display controlling means for reading out the slit video images recorded in the memory means and for outputting corresponding display signals; and a display means for receiving the display signals output by the display controlling means and for visually displaying the slit images that have been recorded.

2. An arrival order judgment apparatus according to claim 1; wherein the second predetermined delay time is set to be longer than the first predetermined delay time.

3. An arrival order judgment apparatus according to claim 1; wherein the solid object identifying means comprises a photoelectric device for optically detecting whether or not the solid objects are on the reference line.

4. An arrival order judgment apparatus according to claim 1; wherein the solid object identifying means comprises an electromagnetic transmitting and detecting device for detecting whether or not a solid object is on the reference line using electromagnetic waves.

5. An arrival order judgment apparatus according to claim 1; wherein the solid object identifying means comprises an acoustic transmitting and detecting device for detecting whether or not a solid object is on the reference line using acoustic waves.

6. An arrival order judgment apparatus according to claim 1; wherein the display means comprises a CRT monitor for visually displaying the slit images recorded in the memory means.

7. An arrival order judgment apparatus according to claim 1; wherein the display means comprises a video printer for visually displaying, in a permanent manner, the slit images recorded in the memory means.

8. In an arrival order judgment apparatus for measuring the passage time as a plurality of solid objects move toward a predetermined reference line to permit the judging of an arrival order thereof, the combination comprising:

a solid object identifying means disposed in correspondence with the reference line for outputting an ON signal when one or more of the solid objects are on the reference line and outputting an OFF signal when one or more of the solid objects are not on the reference line; and a record instruction delay means for receiving OFF signals output by the solid object identifying means and outputting corresponding delayed OFF signals which are delayed from the OFF signals, so that an image of each object may be recorded for a predetermined time after it passes the reference line.

9. An apparatus for measuring the arrival order of a plurality of solid objects moving toward a predetermined reference line, comprising: image pickup means for picking up an image of the respective solid objects as they approach the reference line and outputting corresponding image signals; an image delay circuit for receiving the image signals output by the image pickup means and outputting delayed image signals which are delayed from the image signals by a first predetermined delay time; a timer for starting a timing operation in response to a start signal, monitoring an elapsed time and outputting time information to the image signal delay circuit; identifying means disposed in correspondence with the reference line for outputting an ON signal when a respective solid object is at the reference line and for outputting an OFF signal when no solid object is at the reference line; a record instruction delay means for receiving OFF signals output by the identifying means and outputting corresponding delayed OFF signals which are delayed from the OFF signals by a second predetermined delay time; a memory for commencing a recording operation to record the time information and the delayed image signals output by the image signal delay means in response to an ON signal output by the identifying means and for stopping the recording operation in response to a delayed OFF signal output by the record instruction delay means so that an image of each object is recorded from a predetermined time before said object reaches the reference line until a predetermined time after it passes the reference line; and means for displaying the recorded images.

10. An apparatus for measuring the arrival order of a plurality of solid objects according to claim 9; wherein the image pickup means comprises a slit camera for producing slit images.

11. An apparatus for measuring the arrival order of a plurality of solid objects according to claim 9; wherein the image signals are video image signals.

12. An apparatus for measuring the arrival order of a plurality of solid objects according to claim 9; wherein the second predetermined delay time is longer than the first predetermined delay time.

13. An apparatus for measuring the arrival order of a plurality of solid objects according to claim 9; wherein the identifying means comprises a photoelectric device for optically detecting whether or not the solid objects are on the reference line.

14. An apparatus for measuring the arrival order of a plurality of solid objects according to claim 9; wherein the identifying means comprises an electromagnetic transmitting and detecting device for detecting whether or not a solid object is on the reference line using electromagnetic waves.

15. An apparatus for measuring the arrival order of a plurality of solid objects according to claim 9; wherein the identifying means comprises an acoustic transmitting and detecting device for detecting whether or not a solid object is on the reference line using acoustic waves.

16. An apparatus for measuring the arrival order of a plurality of solid objects according to claim 9; wherein the display means comprises a CRT monitor for visually displaying the images recorded in the memory.

17. An apparatus for measuring the arrival order of a plurality of solid objects according to claim 9; wherein the display means comprises a video printer for visually displaying the images recorded in the memory.

18. In an arrival order judgment apparatus for measuring the arrival order of a plurality of solid objects moving toward a predetermined reference line, the combination comprising: image pickup means for picking up an image of the objects as they approach, cross and pass beyond the reference line; an image delay circuit for delaying the images; means for identifying the solid objects, for outputting an ON signal when one or more of the solid objects are on the reference line and for outputting an OFF signal when none of the solid objects are on the reference line; a signal delay circuit for receiving OFF signals output by the means for identifying and outputting corresponding delayed OFF signals which are delayed from the OFF signals; recording means for recording an image of the objects, the recording means being activated in response to an ON signal to begin recording a delayed image signal of the object approaching the reference line, and being deactivated by a corresponding delayed OFF signal to stop recording the delayed image signal of the object after it has passed the reference line; and means for displaying the recorded image.

* * * * *